United States Patent

[11] 3,601,851

[72] Inventor Stefan Heidinger
 Heidenheim, (Brenz) Germany
[21] Appl. No. 10,442
[22] Filed Feb. 11, 1970
[45] Patented Aug. 31, 1971
[73] Assignee J. M. Voith GmbH
 (Brenz) Germany
[32] Priority Feb. 22, 1969
[33] Germany
[31] P 19 08 933.9

[54] ANNULAR NOZZLE FOR AN EXTRUDER
 8 Claims, 2 Drawing Figs.
[52] U.S. Cl..................................................... 18/14 V,
 18/13 S, 239/455
[51] Int. Cl...................................................... B29d 23/04
[50] Field of Search........................................... 18/14 R, 14
 G, 14 H, 14 T, 14 V, 12 DM, 13 C, 13 D, 13 H, 13
 S, 13 T, 13 R, 5 BV, 14 A, 14 P, 13 A, 13 E, 13 K,
 DIG. 10; 239/455; 1/590

[56] References Cited
UNITED STATES PATENTS
3,111,713  11/1963  Kaplan .......................... 18/14 G
3,221,371  12/1965  Stevens ......................... 18/14 V
3,327,350  6/1967   Limbach ........................ 18/14 V Primary Examiner—J. Spencer Overholser
Assistant Examiner—Norman E. Lehrer
Attorney—Edmund M. Jaskiewicz ABSTRACT: An extruder nozzle has a core swivelly mounted within the passage of the nozzle body so as to define an annular space at the discharge opening of the nozzle. An adjusting lever extends laterally from the swivel point of the core with the axis of the lever passing through the swivel point and being perpendicular to the longitudinal axis of the nozzle. An arrangement of levers and adjustable eccentrics are connected to the adjusting lever on the exterior of the nozzle to permit swiveling of the nozzle core to vary the cross section of the annular discharge opening.

PATENTED AUG 31 1971
3,601,851
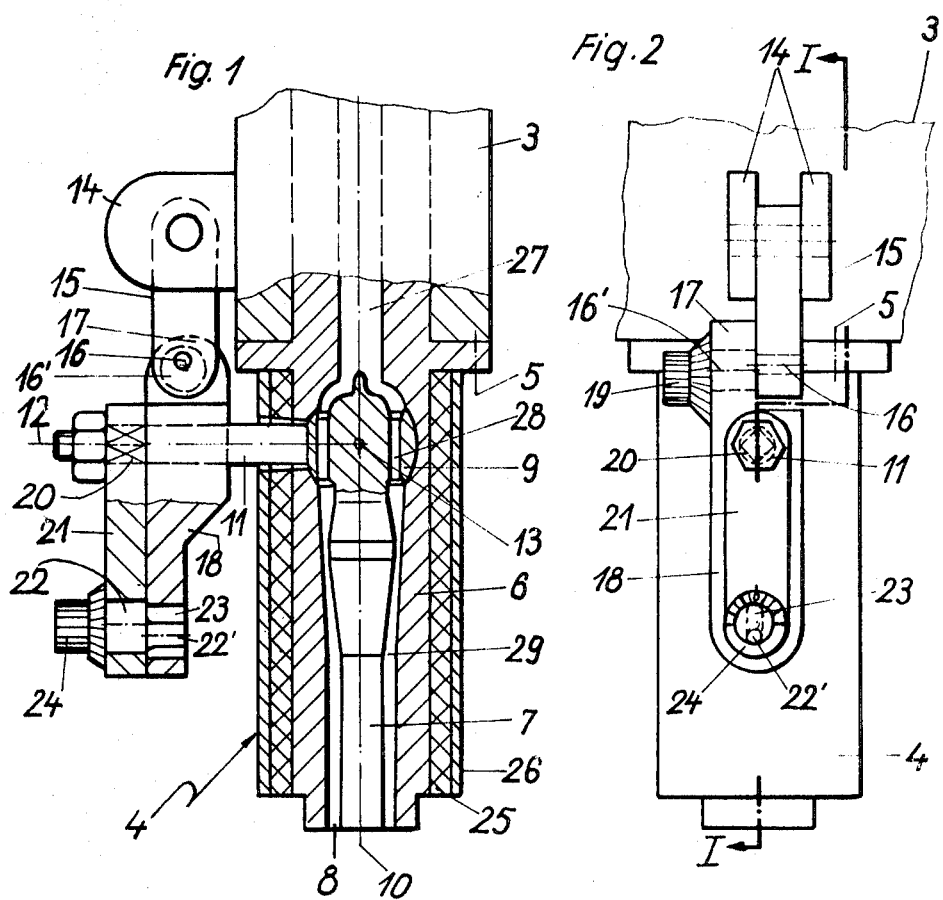
STEFAN HEIDINGER
INVENTOR.
BY Edmund M Jaskiewicz
ATTORNEY

ANNULAR NOZZLE FOR AN EXTRUDER

The present invention relates to a nozzle for a plastics extruder, more particularly, to a nozzle having an annular opening whose cross section can be adjusted.

Annular nozzles to which the present invention relates have been used in blow-molding apparatus for forming of hollow bodies from thermoplastic material. Under certain circumstances it is desirable to vary the cross section distribution of plastic material through the annular discharge opening of the nozzle. The tubular element extruded from the nozzle may be warped or have walls of unequal thickness because of the differential distribution of temperature around the circumference of the annular opening and the nonuniform pressure distribution resulting from such a temperature distribution. The adjustment of the annular discharge opening is generally quite small and usually amounts to only a few one hundredths of a millimeter.

It has been proposed to adjust the annular discharge opening by means of an adjustable ring mounted in the vicinity of the discharge opening for the purpose of adjusting or centering a core swivelly mounted within the nozzle at a point spaced from the discharge opening. The adjustable ring is generally provided with a plurality of laterally extending setscrews so that the adjusting of these screws adjusts the position of the nozzle core. The resulting adjusting structure is not only complex in construction but, in addition, the adjusting setscrews are not readily accessible so that the nozzle core can be adjusted only with great difficulty. Further, when adjustment is carried out during the extruding operation there is the ever present possibility that the operator may burn his hands when manipulating this adjusting structure.

Another form of adjusting structure for the annular opening of an extruder nozzle comprises mounting the forward or discharge portion of the nozzle body on conical sealing surfaces and providing a spherical connection between this forward portion and the remainder of the nozzle body so that the forward portion can be swiveled about a point located on the longitudinal axis of the nozzle. This form of nozzle is also adjusted by means of setscrews which are accessible from a forward position of the nozzle. However, this nozzle not only has the disadvantages of the adjustable nozzle as described above but, has the further disadvantage that when such nozzles are used in a multiple extruder head with the nozzles being closely spaced it is extremely difficult and in many cases almost impossible to manipulate the adjusting screws of one of these nozzles.

It is therefore the principal object of the present invention to provide a novel and improved annular nozzle for extruders.

It is another object of the present invention to provide a simple and reliable structure for selectively adjusting the annular discharge opening of an extruder nozzle.

It is a further object of the present invention to provide an annular nozzle for extruders wherein the cross-sectional variation of the annular discharge opening can be safely and precisely adjusted during operation of the extruder and where the adjusting mechanism is readily accessible to the operating personnel.

According to one aspect of the present invention an annular nozzle for an extruder may comprise a nozzle body having a passage therethrough with a discharge opening at one end. A core is mounted within the passage for swivel movement about a point positioned on the longitudinal axis of the nozzle body passage and spaced inwardly from the discharge opening. A laterally extending adjusting lever is fixed to the core at its swivel point to enable the core to be moveable within the nozzle body to vary the cross section of the annular space of the nozzle discharge opening as defined by the core. The longitudinal axis of the adjusting lever passes through the swivel point and is perpendicular to the longitudinal axis of the nozzle. Adjusting mechanism is mounted on the exterior of the nozzle body and is operatively connected to the adjusting lever so that the nozzle core can be pivoted in two planes perpendicular to each other and passing through the longitudinal axis of the nozzle.

Other objects and advantages of the present invention will be apparent upon reference to the accompanying description when taken in conjunction with the following drawings, which are exemplary, wherein;

FIG. 1 is a longitudinal sectional view of the annular nozzle according to the present invention taken along the line I—I of FIG. 2; and FIG. 2 is a front elevational view of the annular nozzle.

Proceeding next to the drawings wherein like reference symbols indicate the same parts throughout the various views a specific embodiment of the present invention will be described in detail.

As may be seen in the drawings, a nozzle 4 which incorporates the present invention is attached by means of screws 5 to a distributor plate 3 of an extruder which is not shown in the drawings. The nozzle comprises a nozzle body 6 having a passage therethrough in which a core 7 is mounted for swivel movement. One end of the core is positioned at the discharge opening of the nozzle and defines an annular discharge opening 8. The other end of the core is provided with a spherical bearing head 9 mounted for universal movement in a conforming socket formed within the nozzle body.

An adjusting lever 11 is fixed to the spherical bearing head 9 of the core and extends laterally of the nozzle body so as to be positioned at a right angle with the respect to longitudinal axis 10 of the nozzle. The longitudinal axis 12 of the adjusting lever 11 passes through the center, indicated at 13, of the spherical bearing head 9.

A pair of supporting lugs 14 are mounted on the distributor plate 3 and a lever 15 is pivotally mounted therebetween by means of a pin. The lower or free end of lever 15 has journaled therein a pin 16 mounted eccentrically on a disc 16' which is rotatably mounted in a lug 17 of the lever 18 which is loosely mounted on the adjusting lever 11. An adjustment knob 19 is attached to the eccentric disc 16'.

A second adjusting lever 21 is nonrotatably mounted on the four-sided end 20 of the adjusting lever 11. The free end of lever 21 has an eccentric disc 22 rotatably mounted therein with an adjustment knob 24 being attached to the disc 22. A pin 22' extends eccentrically from disc 22 and engages within a longitudinal slot 23 formed in the lower end of the lever 18.

With the adjusting lever arrangement as described above the core 7 may be universally pivoted within the nozzle. Rotation of the adjusting knob 19 will cause the eccentric pin 16 to move vertically and thus effectively vary the length between the attachments at the ends of the lever 15. As shown in the drawings, manipulation of adjustment knob 19 will cause eccentric pin 16 to move downward which would cause lever 18 to move upwardly, thereby moving the adjusting lever 11 also upwardly to cause pivoting of the core 7 in a plane defined by the longitudinal axis 10 of the nozzle and the longitudinal axis 12 of the adjusting lever.

Rotation of the adjusting knob 24 will cause the lever 21 to pivot around the longitudinal axis 12 of adjusting lever 11. This pivoting will occur since the pin 22' is engaged within the slot 23 which remains stationary since the lever 11 remains in a vertical position. thus, rotation of adjusting knob 24 will pivot lever 21 and accordingly pivot adjusting lever 11 around its axis 22 to bring about a pivoting movement of the core 7 in a plane perpendicular to the plane mentioned above. This plane will pass through the nozzle axis 10 and will be perpendicular to the longitudinal axis 12 of the adjusting lever 11.

The nozzle 4 further comprises a cylindrical strip heater 25 and a steel jacket 26 for retaining the strip heater in position. The thermoplastic material which is to be extruded through the annular space 8 enters the nozzle head through the portion of the nozzle passage indicated at 27. A plurality of bores 28 are provided in the spherical bearing head 9 to permit the thermoplastic material to pass therethrough through the annular passage 29 to be discharged in tubular form through the annular opening 8.

It is therefore apparent that the adjustment arranged according to the present invention readily permits adjustment of the annular discharge opening because of the spherical connection of the core within the nozzle body. The pivot point of the adjustable core is removed as far as possible from the discharge opening of the nozzle which is closely adjacent a danger zone which may include the hot thermoplastic tube which has just been extruded and cutters which may be used to sever the extruded tube from the nozzle head. The adjusting levers are positioned on the most accessible portion of the extruder so as to permit a simple and completely safe adjustment during the extruding operation.

While adjusting levers and knobs have been provided the adjusting lever 11 may be operated directly by hand when the spherical head is so fitted within the nozzle that a clamping effect is produced which automatically locks the nozzle in position. However, it has been found that using the adjusting levers and knobs as described above a more accurate and precise adjustment of the nozzle opening can be obtained.

It is understood that this invention is susceptible to modification in order to adapt it to different usages and conditions and, accordingly, it is desired to comprehend such modifications within the invention as may fall within the scope of the appended claims.

What is claimed is:

1. An annular nozzle for an extruder and comprising a nozzle body having a passage therethrough and a discharge opening at one end thereof, a core mounted within said passage, one of said core and nozzle body being mounted for swivel movement about a point on the longitudinal axis of said nozzle body passage and spaced inwardly from the discharge opening, the relative swivel movement between said core and said nozzle body varying the cross section of the annular space defined within the discharge opening by the core, and a laterally extending lever fixed to that one of the core and nozzle body which is swivelly mounted at the swivel point thereof, the longitudinal axis of said lever passing through said swivel point and being perpendicular to the longitudinal axis of the nozzle.

2. An annular nozzle as claimed in claim 1 and comprising spherical support means within said nozzle body for swivelly mounting said core therein.

3. An annular nozzle as claimed in claim 1 and comprising means mounted exteriorly of said nozzle body and to said lever for pivoting said core in a plane defined by the longitudinal axis of the lever and the longitudinal axis of the nozzle.

4. An annular nozzle as claimed in claim 3 wherein said means comprises a second lever having one end attached to a fixed point exteriorly of said nozzle body and the other end moveably connected to said first lever, said second lever being substantially parallel to the longitudinal axis of the nozzle, and means for varying the distance between the end attachments of said second lever so as to pivot the first lever and the core therewith.

5. An annular nozzle as claimed in claim 4 wherein said varying means comprises an eccentric at an end attachment of said second lever.

6. An annular nozzle as claimed in claim 1 and comprising a third lever fixed to said first lever at right angles thereto to pivot said first lever about its longitudinal axis and to pivot said core in a plane perpendicular to said first lever and passing through the longitudinal axis of the nozzle.

7. An annular nozzle as claimed in claim 6 and comprising an adjustable eccentric connection between said third and second levers.

8. An annular nozzle as claimed in claim 7 wherein said second lever has an extension in fixed position with respect to said first lever, said eccentric connection comprising a disk rotatably supported in said third lever and a pin eccentrically positioned on said disk to extend into a longitudinal slot in said second lever extension whereby rotation of said disk pivots said third and first levers with respect to said second lever.